United States Patent [19]
Tenkumo et al.

[11] 3,747,495
[45] July 24, 1973

[54] INTERCHANGEABLE LENS TYPE CAMERA

[75] Inventors: Shohei Tenkumo, Sakai; Takeshi Egawa, Kainan, both of Japan

[73] Assignee: Micro Mega S.A., Besancon, France

[22] Filed: Sept. 18, 1970

[21] Appl. No.: 73,335

[30] Foreign Application Priority Data
Sept. 20, 1969 Japan................................ 44/74346

[52] U.S. Cl.............................. 95/53 EA, 95/53 EB
[51] Int. Cl. ............................................. G03b 9/62
[58] Field of Search ............... 95/42, 53 EA, 53 EB, 95/64 B, 53 E

[56] References Cited
UNITED STATES PATENTS

| | | | |
|---|---|---|---|
| 3,635,142 | 1/1972 | Ataka et al. ............................. | 95/53 |
| 3,502,014 | 3/1970 | Atake .................................... | 95/53 |

*Primary Examiner*—Samuel S. Matthews
*Assistant Examiner*—Michael L. Gellner
*Attorney*—Watson, Cole, Grindle & Watson

[57] ABSTRACT

A camera provided with a circuit for determining the closing of a focal plane shutter in accordance with a desired time interval includes additional control circuitry for enabling an exposure to be controlled by closure of the lens shutter in an objective lens assembly which is mounted to the camera body. The additional control circuitry includes a normally closed switch shunting a first pair of connector terminals to maintain operation of the control circuitry when the objective lens assembly is not mounted to the camera body. The normally closed switch is open with the objective lens assembly mounted to the camera body and mechanism for closing the lens shutter is energized through a normally open switch closed by the opening movement of the focal plane shutter. An additional switch is shunted across a pair of terminals interconnecting the lens assembly with the camera body and is closed with the lens shutter open to maintain energization of the focal plane shutter restraining control mechanism. With the objective lens assembly mounted to the camera the apparatus for determining the exposure time interval is set at a time greater than the exposure interval and the mechanism for closing the lens shutter is energized by the closing of the normally open switch and the opening of the additional switch closes the focal plane shutter by de-energizing the control circuit. In another embodiment an additional normally open switch shunting the integrating capacitor in the control circuit is closed with the mounting of said objective lens assembly to the camera body to automatically disable the control circuit enabling exposure to be effected by the lens shutter.

4 Claims, 3 Drawing Figures

INTERCHANGEABLE LENS TYPE CAMERA

BACKGROUND OF THE INVENTION

The present invention provides control of the exposure by means of the lens shutter in an interchangeable objective lens, in a camera provided with a focal plane shutter electrically controlled.

In an interchangeable objective lens type camera, in general a focal plane shutter is provided in order to simplify the construction of the interchangeable objective lens mechanism.

The focal plane shutter, however, has drawbacks in that the exposure time required for synchronizing with an electronic flash is restricted and distortion of the image results when photographing an object moving at high speed.

Therefore, when photographing such an object as described above, it is necessary to use a lens shutter.

However, when a camera itself is provided with a focal plane shutter, the lens shutter is necessary for the exposure action while the focal plane shutter is at full opening. That is, between the focal plane shutter of the camera and the lens shutter the following sequential operations are necessary:

$a_1$. The completion of the opening screen operation for the focal plane shutter.

$b_1$. The opening/closing action of the lens shutter for exposing.

$c_1$. The completion of the closing screen operation for the focal plane shutter.

And in the case where the camera is in particular a single lens reflex camera:

$a_2$. In order to effect the focusing adjustment and the picture image adjustment, the preopening of the lens shutter and the closing of the focal plane shutter.

$b_2$. The release operation.

$c_2$. The closing operation for the preopening of the lens shutter.

$d_2$. The opening screen operation of the focal plane shutter.

$e_2$. The opening/closing operation of the lens shutter for exposing.

$f_2$. The closing screen operation of the focal plane shutter.

$g_2$. The take-up of the film and the shutter charge action.

$h_2$. The preopening action of the lens shutter.

With the exception of the order $(g_2)(h_2)$ the aforementioned operations are necessary to be successively repeated. And, the time interval of both actions between $(a_1)$ and $(b_1)$, and $(b_1)$ and $(c_1)$, namely, $(d_2)$ and $(e_2)$, and $(e_2)$ and $(f_2)$ are preferred to be small in so far as possible.

The object of the present invention is to provide a detachable objective lens type camera provided with a focal plane shutter controlled by means of an electric control device wherein, when a detachable objective lens with a lens shutter is attached to the camera, the driving operation of the closing screen in the focal plane shutter is initiated simultaneously with the completion of the exposure operation of the lens shutter.

Another object of the present invention is provide a detachable objective lens type camera provided with a focal plane shutter controlled by means of an electric control device wherein, when a detachable objective lens with a lens shutter is attached to the camera, the exposure operation of the lens shutter is initiated simultaneously with the completion of the driving operation of the opening screen for the focal plane shutter through the shutter release operation.

Still another object of the present invention is to provide a detachable objective lens type camera provided with a focal plane shutter controlled with an electric control device wherein, when a detachable objective lens with a lens shutter is mounted to the camera, the driving of the closing screen in the focal plane shutter is retained as long as the exposure operation of said lens shutter is not completed.

The other objects, advantages, and features of the present invention will be clear from the detailed description disclosed hereinafter.

Figure 1:
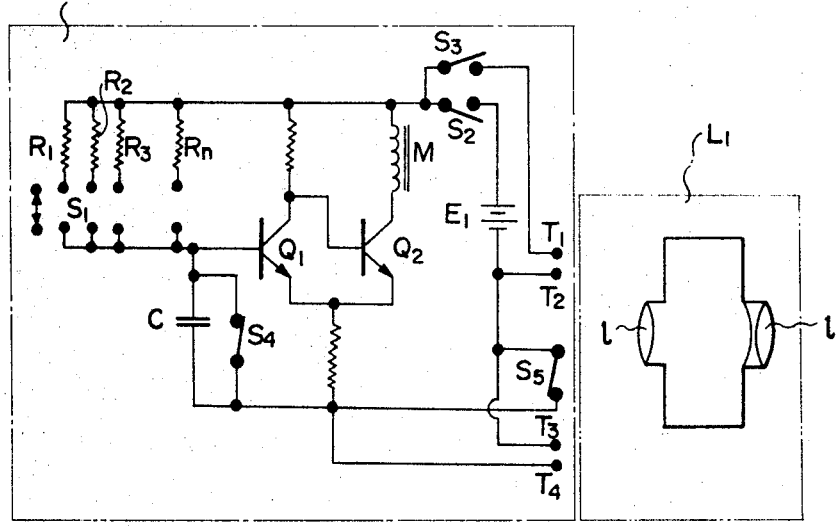
FIG. 1 is a block diagram of an embodiment in accordance with the present invention, wherein the interchangeable objective lens is not provided with a lens shutter.
Figure 2:
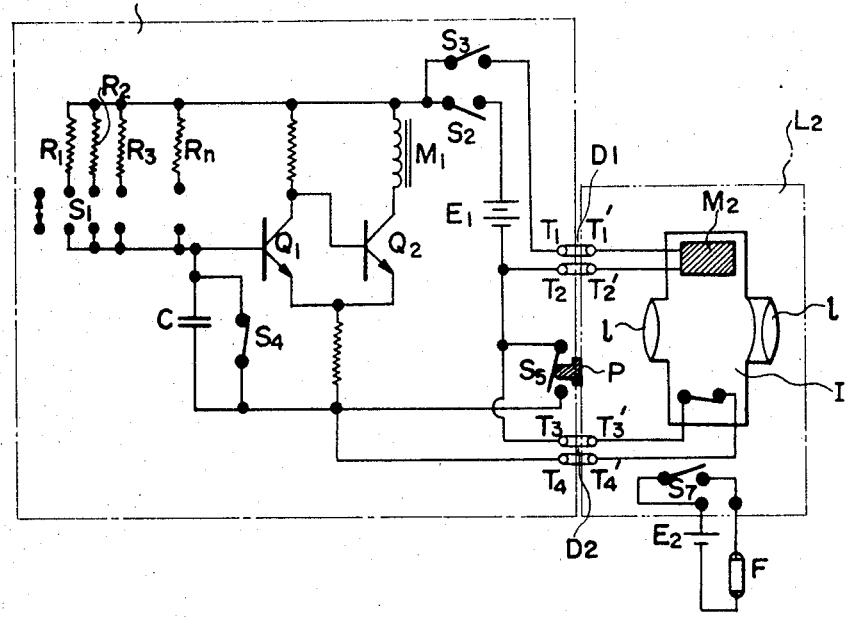
FIG. 2 is a block diagram of an embodiment as shown in FIG. 1, where the interchangeable objective lens has a lens shutter.

DESCRIPTION OF THE PREFERRED EMBODIMENT:

With reference to the embodiment shown in FIG. 1 and FIG. 2 in accordance with the present invention, $B_1$ denotes a camera body and $E_1$ an electric power source. The positive pole of electric power source $E_1$ is connected to resistance group $R_1$, $R_2 R_3$ $R_n$ through power source switch $S_2$ interlocking with the shutter release operation of the camera and normally to closed during the first stage of the release operation, and further connected to condenser C through change over switch $S_1$ for selecting one of resistances $R_1$, $R_2$, $R_3$ $R_n$, the circuit is connected to the negative pole of power source $E_1$ through connecting switch $S_5$ branching from condenser C and terminals $T_3$, $T_4$. Connecting switch $S_5$ is normally closed and as for lens assembly $L_1$ provided with lens $l$ but not provided with a lens shutter as shown in FIG. 1, even though connected to camera body $B_1$ switch $S_5$ remains closed. With regard to lens assembly $L_2$ provided with lens $l$ and a lens shutter as shown in FIG. 2, projection P toward the camera body side as shown in FIG. 2 and when both are correctly connected said opens connecting switch $S_5$.

Lens assembly $L_2$ is provided with another circuit in parallel with connecting switch $S_5$ through terminals $T_3$, $T_4$ mounted on the front of the camera body, and terminals $T_3'$, $T_4'$ are connected electrically by plug $D_2$ when lens assembly $L_2$ is connected correctly to camera body B1. And, between terminals $T_3'$, $T_4'$ there is connected connecting switch $S_6$ by which lens shutter 1 is opened in operation with the termination of the exposure operation thereof. Switch $S_6$ is closed at the same time that lens shutter 1 is charged, and for example, can be opened/closed in interlocking operation of a charge ring not shown in FIG. 2.

A resistance from group $R_1$ to $R_n$ is connected to condenser C through change over switch $S_1$ so as to form a delay circuit, and the node thereof is connected to the base of transistor $Q_1$ and the base of transistor $Q_2$ is connected to the output of transistor $Q_1$. To the collector of transistor $Q_2$ is connected electromagnet $M_1$ for starting the closing screen and transistors $Q_1$, $Q_2$ form a Schmidt trigger circuit. And, timing switch $S_4$ is connected in parallel with condenser C.

Power source $E_1$, including power source switch $S_2$ is connected to another lens shutter control circuit. That is, the circuit is from signal switch $S_3$ connected in series to power source switch $S_2$ to terminal $T_1$ on the camera body $B_1$ side, and connected through terminal $T'_1$ provided on lens assembly $L_2$ to terminal $T_1$ through plug $D_1$ $L_2$ to electromagnetic release $M_2$ for releasing the exposure operation of the shutter lens, and therefrom connected to power source $E_1$ through plug $D_1$ connecting terminal $T_2'$ to $T_2$ manner as in terminals.

Synchro switch $S_7$ is ordinarily opened and closed in synchronization with the opening of the lens shutter, and forms a flash circuit together with power source $E_2$ and electronic flash F.

The opening screen for the focal plane shutter starts its movement by a well known mechanism not shown in the drawings in accordance with the release operation, and timing switch $S_4$ is opened with movement of the opening screen for the focal plane shutter. And, when assembly $L_1$ with a lens shutter as shown in is being connected to camera body $B_1$ there is no projection P, so that connecting switch $S_5$ is closed, and when condenser C is charged to a certain voltage electromagnet $M_1$ theretofore by being electrified through the Schmidt is demagnetized and accordingly the focal plane shutter closing screen by said electromagnet is released thereby, in a delay time determined by the resistance value of one of resistances $R_1$ to $R_n$ the exposure by the focal plane shutter is effected.

When lens assembly $L_2$ provided with a lens shutter is connected to camera body $B_1$ connecting switch $S_5$ is opened by projection P. However, through terminals $T_3$, $T_3'$ and $T_4$, $T_4'$ connected by plug $D_2$ connecting switch 6 is closed by the shutter charge of lens shutter 1, so that power source switch $S_2$ is closed and at the same time electromagnet $M_1$ is energized. In the case of a single lens reflex camera, through release operation ($b_2$) the lens shutter is opened first and at the first stage thereof is closed ($C_2$), and then the opening screen for the focal plane shutter moves ($d_2$) release by said. In interlocking operation with the opening screen movement timing switch $S_4$ is opened and condenser C starts to be charged, however, at this juncture $R_1$ to $R_n$ are being a high is connected by change over switch $S_1$, so that a is being made so as to take long enough time is available for reversing transistor $Q_1$.

By the termination of the opening screen movement signal switch $S_3$ is closed and the control circuit is closed, so that electromagnetic release $M_2$ operates and lens shutter 1 effects the exposure action ($e_2$), Meanwhile switch $S_7$ is closed and electronic flash F is operated. Simultaneously with the termination of the exposure operation of lens shutter 1, connecting switch $S_6$ is opened, so that the excitation of electromagnet $M_1$ is stopped before the Schmidt trigger circuit operates and whereby, the closing screen movement is actuated the screening action by said ($f_2$). After the exposure is finished, by carrying out the re-winding of the film and the shutter is charged ($g_2$) the screening movement by the opening and closing screens ($a_2$) is continued and the preopening action of the lens shutter is effected ($h_2$).

Figure 3:
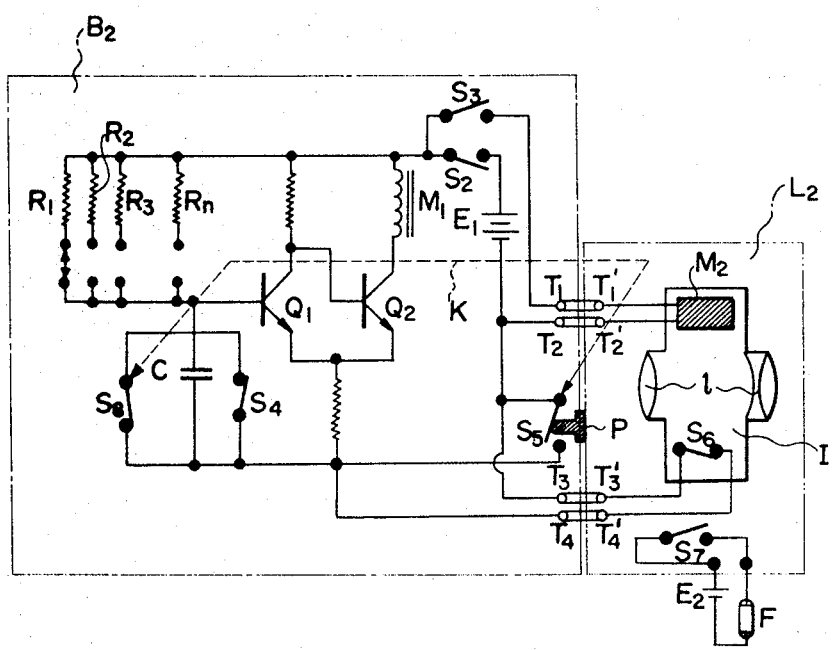
FIG. 3 is a block diagram interchangeable lens type of another embodiment in accordance with the present invention, wherein the interchangeable objective lens also has a lens shutter.

In the aforementioned embodiment, when photographing through lens shutter 1, in order to restrain the action of the closing screen movement for the focal plane shutter, which screening action is electrically effected until the exposure of the lens shutter is, it is necessary to adjust the contorl circuit thereof so as to correspond to the exposure time of the lens shutter for all such occasions, or so as to enable the lens shutter to operate for the longest exposure. However, according to the embodiment shown in FIG. 3, in camera body $B_2$ there are provided condenser C, timing switch $S_4$ in parallel therewith, and interlocking switch $S_8$ in parallel therewith, and switch $S_8$ is ordinarily opened. And, lens assembly $L_2$, provided with a lens shutter, is connected to camera body $B_2$, and when projection P thereof opens connecting switch $S_5$ interlocking switch 8 is closed in interlocking operation with connecting switch $S_5$ because both switches are interlocked with each other by means of interlocking member K. In this manner, when lens assembly $L_2$ is connected to camera body $B_2$, even though the opening screen starts to travel and timing switch $S_4$ is opened condenser C does not start to be charged, the Schmidt trigger circuit does not operate, and electromagnet $M_1$ is demagnetized only by opening of connecting switch $S_6$ accompanied by the exposure termination of lens shutter 1 and releases the closing screen movement. In this case, no matter to what value resistances $R_1$ to $R_n$ are set up the correct operation is effected.

Further, the exposure action of lens shutter 1 itself in the first and second embodiments can be controlled electrically or mechanically but the thereof is omitted herein.

We claim:

1. Apparatus for controlling the opening and closing of the focal plane and lens shutters in a camera of the type wherein the objective lens is removably mounted to the camera body, comprising:
   means for determining a time interval in accordance with a desired exposure for closing said focal plane shutter subsequent to the opening thereof;
   control means responsive to said means for determining to restrain said focal plane shutter from closing during said time interval;
   said camera body including a power source, a first pair of connector terminals for interconnecting said power source and said control means, and a normally closed first switch shunting said first pair of terminals for maintaining operation of said control means during an exposure, a second pair of terminals, a normally open second switch closed by the opening movement of said focal plane shutter to electrically energize said second pair of terminals, a third switch closed with operation of the shutter release mechanism and interconnected between said power source and said control means;
   an objective lens assembly removably mounted to said camera body and including means for actuating said lens shutter, means for opening said normally closed first switch, a third pair of terminals mating with said second pair of terminals and connected to energize said means for actuating said lens shutter, a fourth switch closed with said lens shutter cocked and open when said lens shutter terminates an exposure, a fourth pair of terminals engaging said first pair of terminals and said fourth switch is connected across said fourth pair of terminals; and said means for actuating is energized by the closing of said normally open second switch to effect exposure by actuating said lens shutter and the opening of said fourth switch closes said focal plane shutter by de-energizing said control means.

2. Apparatus as in claim 1 wherein said means for determining is set at a time interval greater than the exposure interval thereby enabling an exposure to be effected solely by closing of said lens shutter.

3. Apparatus as in claim 1 wherein said means for determining further includes a fifth switch interlocked to be actuated with the opening of said normally closed first switch with said objective lens assembly mounted to said camera body for deactivating said means for determining a time interval, whereby exposure is effected by actuation of said means for actuating said lens shutter.

4. Apparatus as in claim 3 wherein said means for determining a time interval includes a capacitor, and said fifth switch is normally open and is closed with the opening of said normally closed first switch for shunting said capacitor.

* * * * *

UNITED STATES PATENT OFFICE
CERTIFICATE OF CORRECTION

Patent No. 3,747,495    Dated July 24, 1973

Inventor(s) Tenkumo et al

It is certified that error appears in the above-identified patent and that said Letters Patent are hereby corrected as shown below:

[73] Assignee: MINOLTA CAMERA KABUSHIKI KAISHA
      Osaka, Japan

Signed and sealed this 23rd day of April 1974.

(SEAL)
Attest:

EDWARD M. FLETCHER, JR.        C. MARSHALL DANN
Attesting Officer              Commissioner of Patents